Dec. 12, 1967  D. C. HOFFMANN  3,358,250
LOCKOUT ARRANGEMENT FOR AN ELECTRIC CIRCUIT BREAKER
Filed Nov. 3, 1966  2 Sheets-Sheet 1

INVENTOR:
DANIEL C. HOFFMANN,
BY William Freedman
ATTORNEY

Dec. 12, 1967    D. C. HOFFMANN    3,358,250
LOCKOUT ARRANGEMENT FOR AN ELECTRIC CIRCUIT BREAKER
Filed Nov. 3, 1966    2 Sheets-Sheet 2
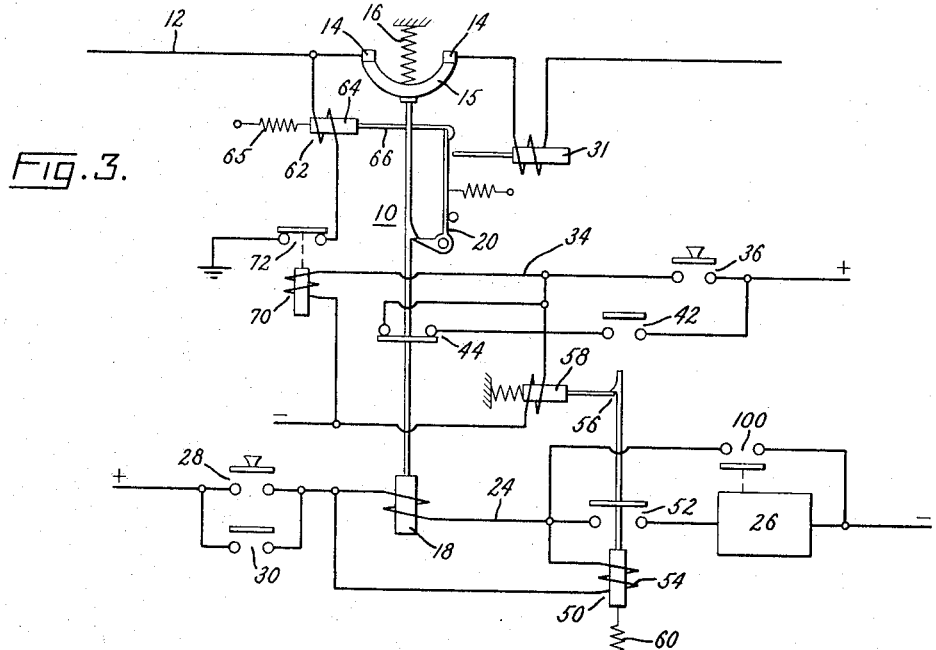
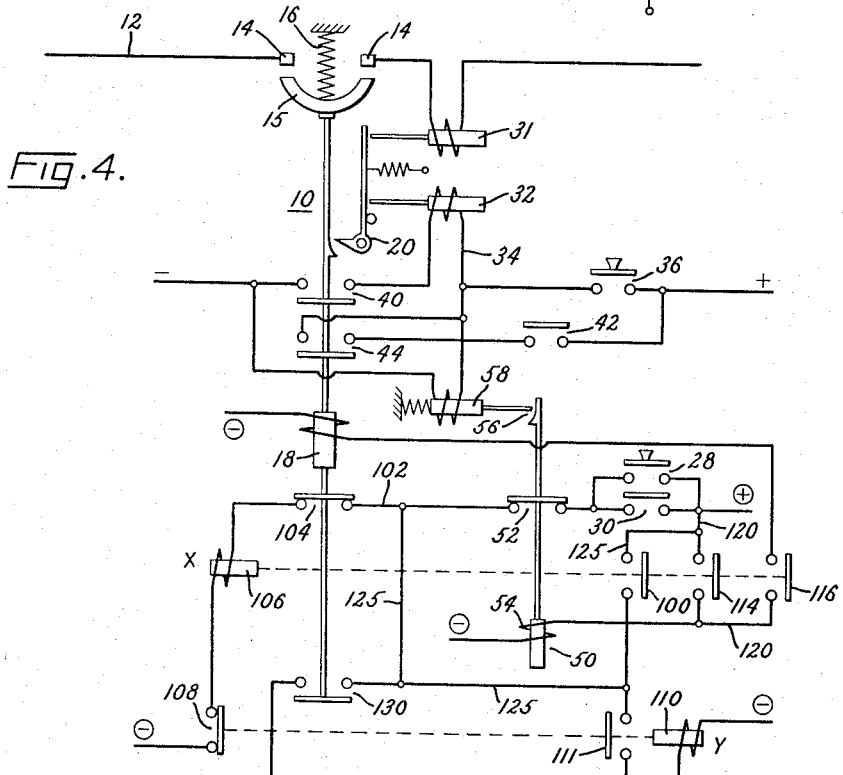
INVENTOR:
DANIEL C. HOFFMANN,
BY William Freedman
ATTORNEY

United States Patent Office 3,358,250
Patented Dec. 12, 1967

3,358,250
LOCKOUT ARRANGEMENT FOR AN ELECTRIC CIRCUIT BREAKER
Daniel C. Hoffmann, Lansdowne, Pa., assignor to General Electric Company, a corporation of New York
Filed Nov. 3, 1966, Ser. No. 591,735
5 Claims. (Cl. 335—28)

This invention relates to a control circuit for an electric circuit breaker and, more particularly, to a control circuit which prevents the circuit breaker from reclosing (i.e., causes lockout) if the circuit breaker is tripped open in response to predetermined conditions but permits reclosing if the circuit breaker is tripped open in response to conditions other than said predetermined conditions.

In certain circuit breaker applications, it is important to lock out the circuit breaker if it should trip open in response to a condition indicative of a circuit abnormality, e.g., overcurrent or undervoltage. But if the breaker should be tripped open manually by its control switch or in response to some other condition, it should be permitted to reclose. In certain circuit breakers, this selective lockout is effected by a mechanical linkage that operates a lockout device in response to operation of the circuit breaker's overcurrent trip device or in response to operation of the circuit breaker's undervoltage trip device.

In certain other circuit breakers, however, there is no space available for such a mechanical linkage or there is some other reason why a mechanical linkage is not desirable; and some other more suitable means, e.g., means less consumptive of critical space, must be used for effecting the desired lockout. It is also important that this lockout means be capable of producing the desired lockout without regard to whether or not control power is available at the time the circuit breaker is tripped open.

Accordingly, an object of the present invention is to provide lockout means capable of effecting the selective lockout described hereinabove, but not requiring critical space adjacent the circuit breaker and not requiring control power when the circuit breaker is tripped open.

For a better understanding of the invention, reference may be had to the following description taken in conjunction with the accompanying drawings, wherein:

FIG. 3 is a wiring diagram of a modified form of the invention.

FIG. 4 is a more detailed wiring diagram of the embodiment of the invention depicted in FIGS. 1 and 2.

Figure 1:
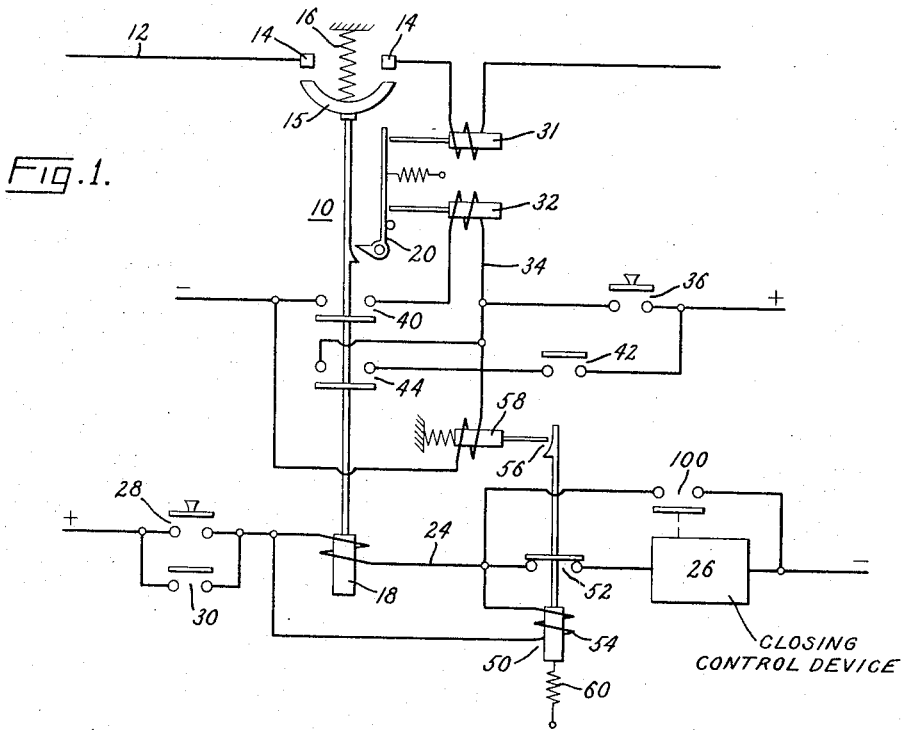
FIG. 1 is a schematic wiring diagram of a control circuit embodying one form of my invention. The circuit breaker being controlled is shown in its open position.

Referring now to FIG. 1, there is shown a circuit breaker 10 that is adapted to make and break a power circuit 12. This circuit breaker comprises a set of stationary contacts 14 and a bridging contact 15 movable into and out of engagement with stationary contacts. In FIG. 1, the bridging contact 15 is shown in its open position, into which it is biased by a suitable opening spring 16. Closing of the circuit breaker is effected by energizing a closing solenoid 18 to drive the bridging contact 15 upwardly into engagement with the stationary contacts 14. When the bridging contact reaches its closed position of FIG. 2, it is held in this position by a suitable holdclosed latch 20.

Circuit breaker closing is effected by completing a suitable closing circuit 24. This closing circuit 24 includes the closing solenoid 18, a closing control device schematically shown at 26, and two closure-initiating switches 28 and 30. The switches 28 and 30 are connected in parallel, and this parallel combination is connected in series with solenoid 18 and closing control device 26. Switch 28 is a manually-controlled switch, and switch 30 is a switch controlled by a suitable sequencing device (not shown) operable in response to any desired condition. The closing control device 26 is a suitable closing control device (for example, an X-Y circuit) that acts to prevent pumping and incomplete closing of the circuit breaker. FIG. 4 illustrates this X-Y circuit in more detail and is referred to hereinafter.

When the various components are in their position of FIG. 1, closing of either switch 28 or 30 will complete the closing circuit 24, thereby energizing closing solenoid 18. Closing solenoid 18 responds by driving bridging contact 15 upwardly into its closed position of FIG. 2, where it is held by latch 20.

Figure 2:
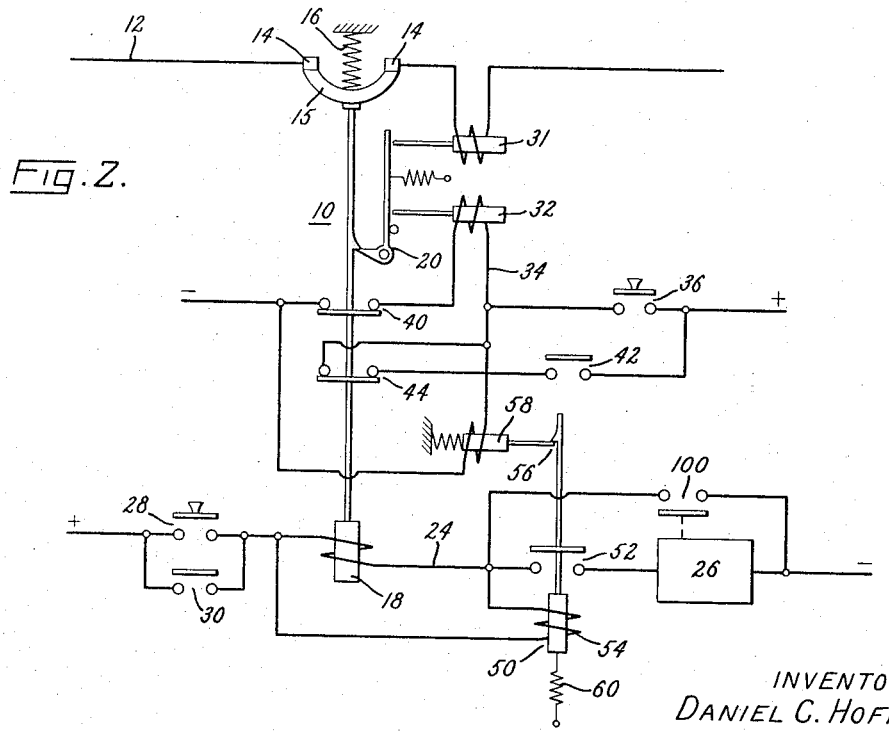
FIG. 2 is a schematic wiring diagram of the circuit of FIG. 1 except showing the circuit breaker in closed position.

When the circuit breaker is to be opened, the latch 20 is released, thereby permitting opening spring 16 to separate the contacts. In the embodiment of FIGS. 1 and 2, tripping can be effected by an overcurrent trip device 31 sensitive to overcurrent in power circuit 12 or by another trip device 32 sensitive to conditions other than overcurrent. The overcurrent trip device is shown as a tripping solenoid 31 having its coil connected in series with power line 12. When an overcurrent flows through power circuit 12, solenoid 31 responds by releasing latch 20, thereby permitting the circuit breaker 10 to open.

The other trip device 32 is a tripping solenoid having its coil connected in a tripping circuit 34. The tripping circuit 34 comprises a manually-operable opening-control switch 36 and an "a" switch 40 on the circuit breaker, all connected in series with the coil of tripping solenoid 32. In parallel with the manual opening-control switch 36 is another opening-control switch 42 and an "a" switch 44 of the circuit breaker. The opening control switch 42 is arranged in a conventional manner (not shown) to close in response to predetermined conditions other than overcurrent.

Assuming the parts are in the position of FIG. 2, when either of the opening-control switches 36 or 42 is closed, the tripping circuit 34 is completed, thereby energizing tripping solenoid 32. Tripping solenoid 32 responds by releasing latch 20 to effect circuit breaker opening.

As pointed out hereinabove, it is often desirable that a circuit breaker that opens in response to an overcurrent be locked out so that it cannot be reclosed except after a deliberate resetting of its controls. For effecting such lockout, I rely upon a lockout relay 50. This relay 50 has a set of lockout contacts 52 connected in series with the closing solenoid 18 and closing control device 26. When these contacts 52 of lockout relay 50 are closed, as shown in FIG. 1, operation of either of the closure-initiating switches 28 or 30 is effective to complete closing circuit 24 and thereby energize closing solenoid 18 to close the breaker. But when the contacts 52 of the lockout relay are open, this closing circuit 24 normally cannot be completed, and closing is prevented, i.e., the circuit breaker is locked-out.

For operating the lockout relay 50 into its lockout-producing position, I connect the operating coil 54 of the lockout relay in parallel with the closing solenoid 18 and in series with switches 28 and 30. Thus, whenever switch 28 or 30 is closed to produce a closing operation of solenoid 18, the operating coil 54 of the lockout relay is energized to cause the lockout relay to operate and open its lockout contacts 52. When the lockout relay has operated to open its contacts 52, it is latched in its operated position by a releasable latch 56, as shown in FIG. 2. Thus, each time the circuit breaker is closed the lockout relay 50 opens its contacts 52 and these contacts are latched in their open position of FIG. 2. So long as the contacts are latched in their open position of FIG. 2, thereby the closing circuit 24 cannot be completed to produce another circuit breaker closing operation.

To allow a circuit breaker closing operation to be completed despite opening of the lockout contacts 52 during a closing operation, a seal-in switch 100 is provided in parallel with lockout contacts 52. This seal-in switch 100 closes prior to opening of contacts 52 during a closing operation, thus preventing closing circuit 24 from being interrupted by opening of contacts 52 during the closing operation. At the end of a closing operation, seal-in switch 100 opens and stays open. The seal-in switch 100 can be reclosed only if lockout switch 52 is first reclosed. The manner in which the schematically shown seal-in switch 100 is operated will be apparent from the detailed diagram of FIG. 4.

If the circuit breaker is tripped open by the overcurrent trip device 31 in response to an overcurrent through power circuit 12, the lockout relay 50 remains in its position of FIG. 2 with its contacts 52 latched open, thereby locking-out the circuit breaker to prevent its reclosing. But if the circuit breaker is tripped open by means other than the overcurrent trip device 31, i.e., by operation of either manual control switch 36 or control sequence switch 42, then no lockout occurs. For preventing lockout under these conditions, the releasable latch 56 is provided with a releasing solenoid 58, which is connected in tripping circuit 34 in parallel with the normal tripping solenoid 32 and "a" switch 40. Upon energization, this releasing solenoid 58 operates to release the latch 56 thereby permitting contacts 52 to close under the influence of suitable biasing means, e.g., spring 60. It will thus be seen that tripping of the circuit breaker through normal tripping solenoid 32 disables the lockout relay, allowing it to return to its position of FIG. 1 so that a reclosing operation can be initiated when the circuit breaker has opened in this particular manner.

It will be apparent from the above description that the lockout relay 50 is opened each time the circuit breaker is closed. Only when the normal tripping solenoid 32 is operated, is the lockout relay disabled and permitted to return to its position of FIG. 1 to allow circuit breaker reclosing. The lockout relay is unaffected by overcurrent tripping and thus remains in its position of FIG. 2 to prevent reclosing following overcurrent tripping. Since operation of the lockout relay 50 utilizes closing power and takes place coincidental with closing, it should be apparent that the ability of the lockout relay to produce lockout is not dependent upon a reliable source of control power being available during opening. By the time opening occurs, the lockout relay 50 is already in its lockout-producing position.

The lockout arrangement of FIGS. 1 and 2 does not consume critical space adjacent the circuit breaker inasmuch as it requires only the lockout relay 50 to provide for the desired lockout performance, and this relay, being electrically coupled to the circuit breaker, can be mounted in a nearby control panel with other components of the electrical portion of the control system.

FIG. 3 shows another embodiment of the invention. The same reference numerals have been used in FIG. 3 and FIGS. 1 and 2 to designate corresponding parts. In the embodiment of FIG. 3, the circuit breaker can be tripped open in response to an undervoltage condition on power circuit 12 as well as in response to overcurrent. This undervoltage tripping is performed by means of undervoltage trip device 62 comprising a solenoid 64, which, when energized tends to hold the trip device 62 in its non-operated condition of FIG. 3 against the bias of a suitable operating spring 65. So long as the voltage across solenoid 64 is above a predetermined level, the solenoid is effective to hold the undervoltage trip device in its non-operated position of FIG. 3. But when the voltage falls below this predetermined level for a predetermined time, the operating spring 65 predominates, moving operating arm 66 of the trip device to the left, thereby releasing latch 20.

The solenoid 64 is connected between the power circuit 12 and ground so as to be sensitive to the voltage between the power circuit 12 and ground. If this voltage falls below a predetermined level, operating spring 65 predominates and operates the undervoltage trip device to produce circuit breaker opening. Overcurrent tripping is performed b the overcurrent trip device 31 in the same manner as described with respect to FIGS. 1 and 2.

If the breaker is tripped in response to either overcurrent through power circuit 12 or undervoltage on power circuit 12, the lockout relay 50 is unaffected. It remains latched in its position of FIG. 3 to prevent circuit breaker reclosing thereby effecting lockout of the circuit breaker.

Normal tripping is performed in the embodiment of FIG. 3 by closing either manual switch 36 or the switch 42 of the sequence control device. This completes the tripping circuit 34, causing a tripping relay 70 to operate and open its contacts 72. Opening of these contacts 72 removes voltage from across solenoid 64, allowing undervoltage trip device 62 to trip the circuit breaker. No lockout follows such a circuit breaker opening operation because the release coil 58 of lockout relay 50 is connected in parallel with the tripping relay 70. As a result, each time the tripping relay 70 is operated, the release coil 58 of the lockout relay is energized, thereby disabling lockout relay 50 and permitting it to return to its position of FIG. 1. In this position, the lockout relay is ineffective to block closing.

A more detailed diagram of FIG. 4 shows how the closing control device 26 of FIG. 1 or FIG. 3 may be constructed in one specific embodiment of the invention. Corresponding reference numerals are used in FIGS. 4 and 1 to the extent possible. Referring to FIG. 4, when closure-initiating switch 28 or 30 is closed, it completes a closure-initiating circuit 102 from the plus terminal through lockout contacts 52, "bb" switch 104, the coil of X relay 106, the closed contacts 108 of Y relay 110 to the negative terminal. The X relay 106 responds by closing its contacts 100, 114, and 116. The closing of contacts 114 completes a closing circuit 120 for solenoid 18. This circuit 120 extends from the plus terminal through contacts 114 and 116 and the coil of closing solenoid 18 to the negative terminal. Closing solenoid 18 responds by closing the circuit breaker.

At the same time the closing solenoid 18 is energized, the coil 54 of lockout relay 50 is energized since it is parallel with closing solenoid 18. The lockout relay responds by opening its lockout contacts 52, but this does not interrupt the closing operation since the X relay 106 remains in its operated position since its coil receives current through a seal-in circuit 125 that is in parallel with the lockout contacts 52. This seal-in circuit 125 extends around the lockout contacts 52 through the seal-in contacts 100 of the X relay 106.

At the end of the closing stroke, a set of "aa" contacts 130 on the circuit breaker are closed, thus picking up Y relay 110. The Y relay responds by sealing itself in through contacts 111 and opening its contacts 108 to drop-out the X relay 106. When the X relay 106 is thus dropped out at the end of a closing stroke, it opens its contacts 100, 114, and 116. The opening of seal-in contacts 100 drops out Y relay 110, restoring it to its position of FIG. 4. The lockout relay 50, however, remains in its operated position of FIG. 2 since it is latched in this position by latch 56.

The manner in which the circuit of FIG. 4 responds to an opening operation is the same as that described in connection with FIGS. 1 and 2, and this description will therefore not be repeated.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. An electric circuit breaker for controlling current through a power circuit, comprising:
   (a) first trip means sensitive to current in said power circuit for producing circuit breaker-opening in response to a predetermined circuit condition in said power circuit,
   (b) additional trip means for producing opening of said circuit breaker in response to conditions other than said predetermined circuit condition in said power circuit,
   (c) closing means for producing a first closing operation of said circuit breaker,
   (d) lockout means operable when effective to prevent said closing means from producing a second closing operation,
   (e) means responsive to said first closing operation for rendering said lockout means effective, whereby additional closing operations are prevented so long as said lockout means remains effective,
   (f) lockout-disabling means responsive to operation of said additional trip means for rendering said lockout means ineffective to prevent closing following an opening operation initiated by said additional trip means,
   (g) said lockout-disabling means being nonresponsive to operation of said first trip means,
   (h) and means for maintaining said lockout means effective despite an opening operation produced by said first trip means.

2. The circuit breaker of claim 1 in which said first trip means is overcurrent trip means and said predetermined condition to which said first trip means is sensitive is an overcurrent through said power circuit.

3. The circuit breaker of claim 1 in which said first trip means is an undervoltage trip device and said predetermined condition to which said first trip device is sensitive is an undervoltage condition on said power circuit.

4. The circuit breaker of claim 1 in which:
   (a) said lockout means comprises a lockout relay that is operated into a lockout-producing position in response to initiation of a first closing operation and restraining means for maintaining said relay in said lockout-producing position,
   (b) said lockout-disabling means comprises means for releasing said restraining means in response to operation of said additional trip means.

5. The circuit breaker of claim 4 in which:
   (a) said lockout relay comprises a set of lockout contacts in series with said closing means and arranged to open in response to operation of said lockout relay, and
   (b) seal-in means is provided to assure completion of a closing operation despite opening of said lockout contacts before completion of a closing operation.

References Cited

UNITED STATES PATENTS

| | | | |
|---|---|---|---|
| 1,780,676 | 11/1930 | Hough | 323—106 |
| 1,798,365 | 3/1931 | Burnham | 317—22 |
| 2,921,238 | 1/1960 | Wollerton | 317—22 |

BERNARD A. GILHEANY, *Primary Examiner.*

H. BROOME, *Assistant Examiner.*